Dec. 11, 1928.
D. C. KINNEAR
1,694,922
DRAWING APPARATUS
Filed Feb. 24, 1928
4 Sheets-Sheet 1
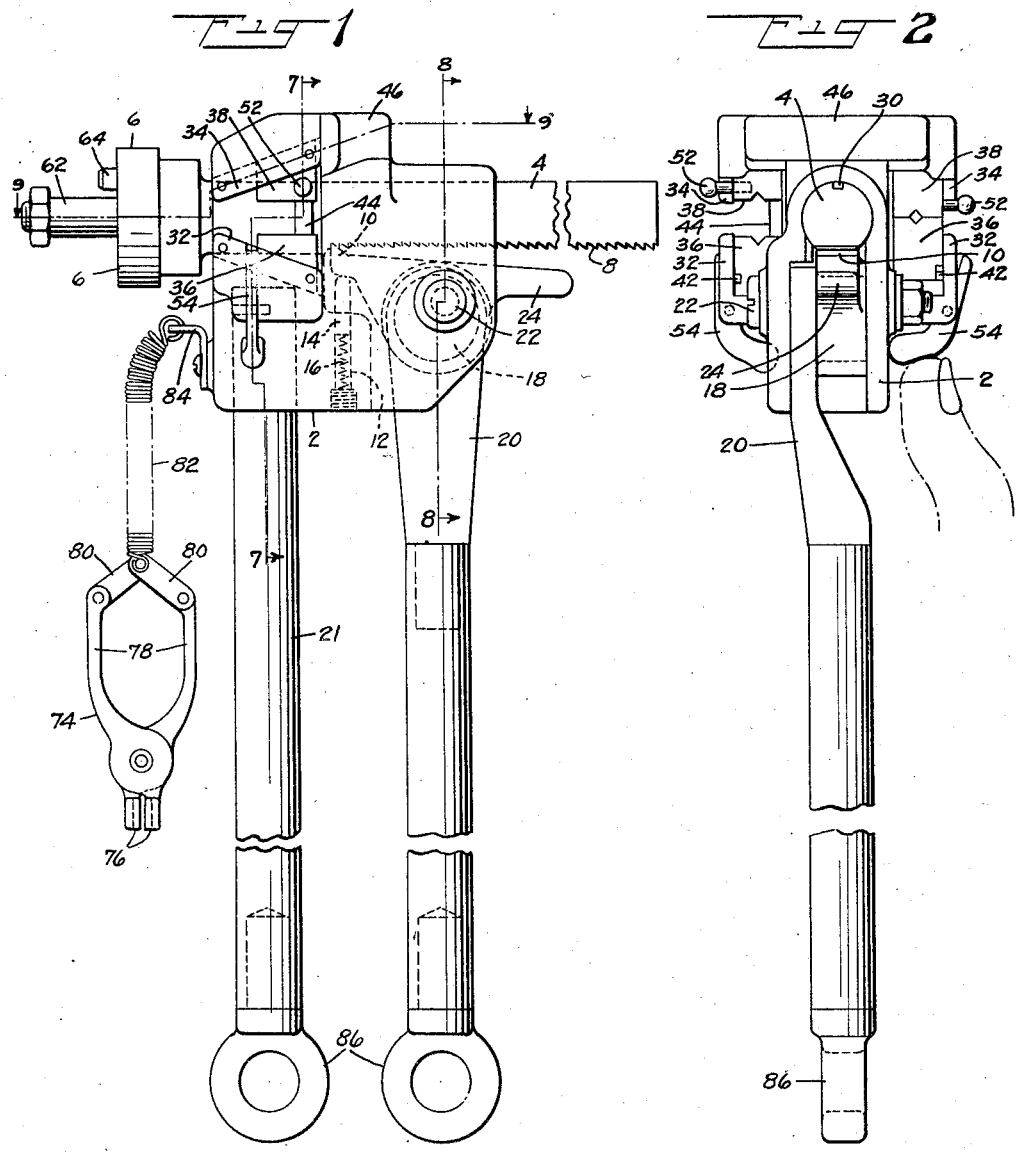
INVENTOR.
D. C. Kinnear
BY
ATTORNEYS.

Dec. 11, 1928.
D. C. KINNEAR
1,694,922
DRAWING APPARATUS
Filed Feb. 24, 1928          4 Sheets-Sheet 2
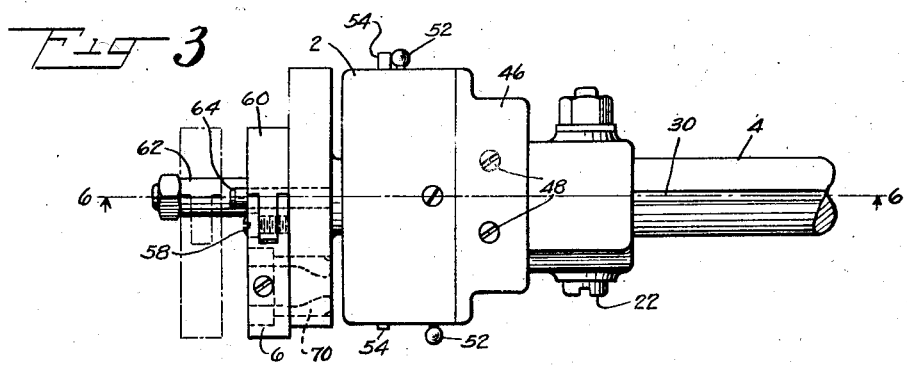
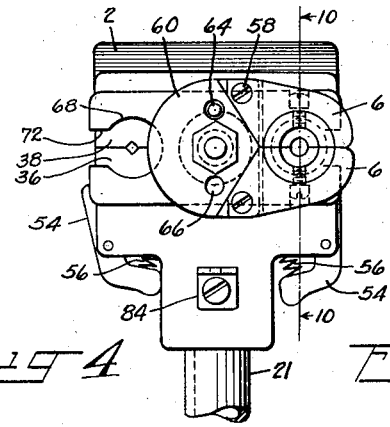 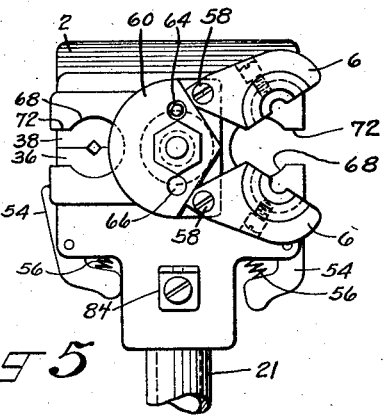
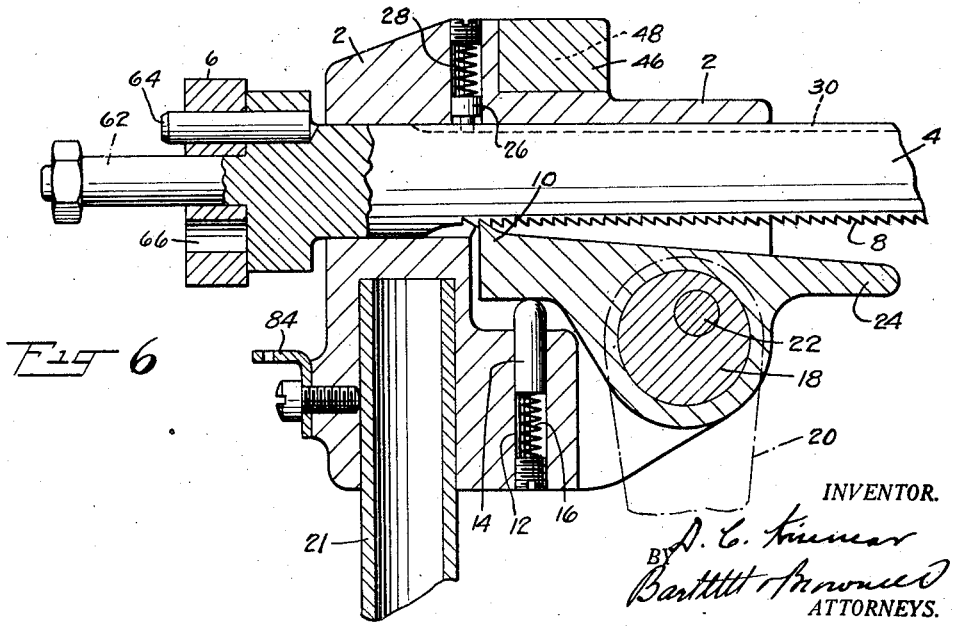
INVENTOR.
D. C. Kinnear
BY Bartlett Brownell
ATTORNEYS.

Dec. 11, 1928.

D. C. KINNEAR 1,694,922

DRAWING APPARATUS

Filed Feb. 24, 1928    4 Sheets-Sheet 3

D. C. Kinnear INVENTOR.
BY Bartlett [signature]
ATTORNEYS.

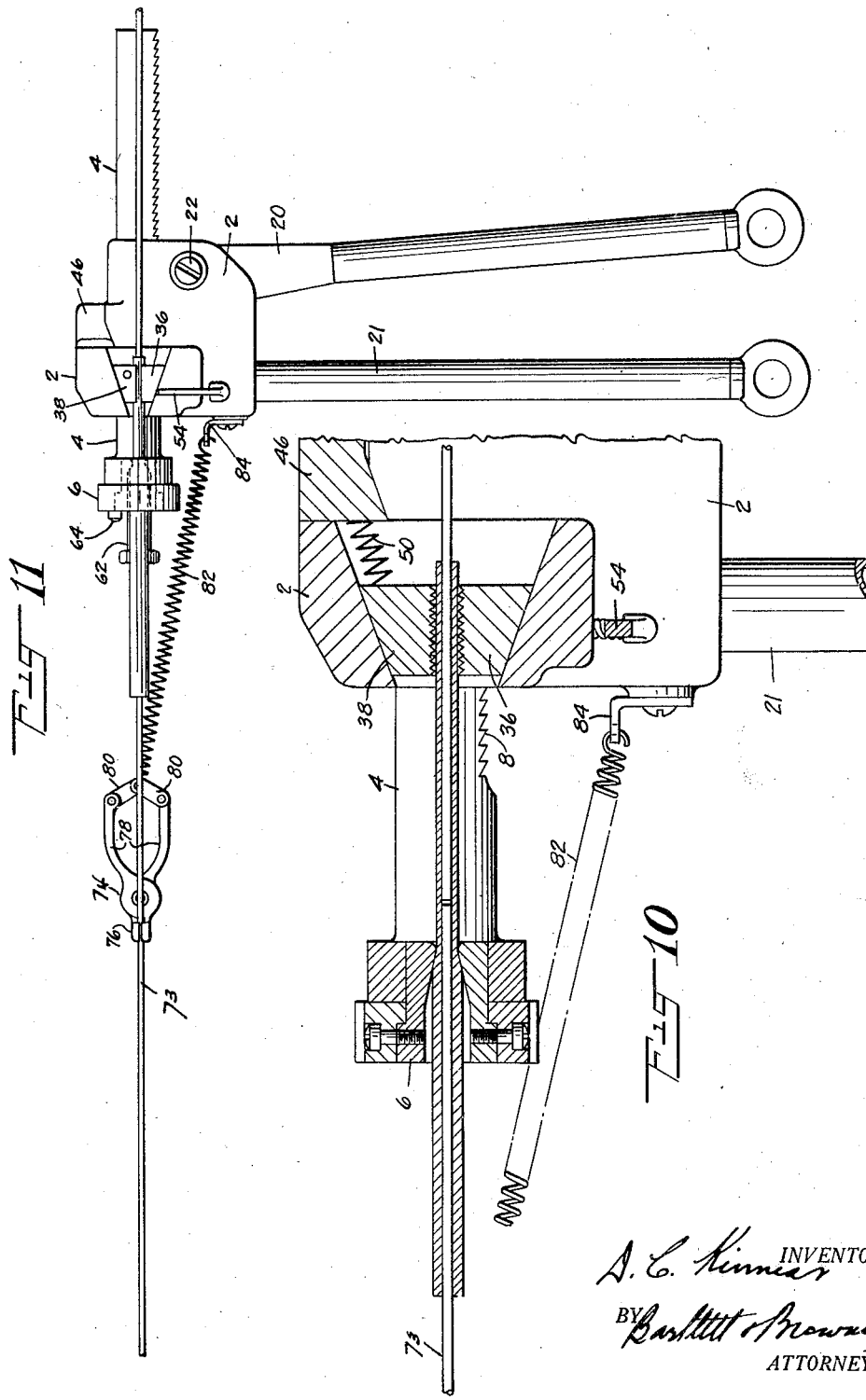

Patented Dec. 11, 1928.

1,694,922

UNITED STATES PATENT OFFICE.

DELAMAR C. KINNEAR, OF WATERBURY, CONNECTICUT, ASSIGNOR TO THE AMERICAN BRASS COMPANY, OF WATERBURY, CONNECTICUT, A CORPORATION OF CONNECTICUT.

DRAWING APPARATUS.

Application filed February 24, 1928. Serial No. 256,683.

My invention relates to improvements in drawing apparatus and has for its object to provide a new and improved tool for applying tubular connectors to adjacent ends of two conductors. It further has for its object to provide a tool having working faces on each side such that by reversing the tool the work may always be located on the upper side of the tool, or so that the tool may be beneath the work when in either position. It further has for its object to provide a tool having spring actuated clamping jaws for the work and manually controlled means for holding the jaws in open position and releasing them when desired. It further has for its object to provide means for holding in adjacent position the two ends of the conductors to be joined. It further has for its object to provide a new and improved pawl and controlling means therefor.

The following is a description of an embodiment of my invention,

Figure 1 being a side elevation of a tool embodying my invention;

Fig. 2 is a rear end view of the same;

Fig. 3 is a top view of the same;

Fig. 4 is a front view of the same showing the dies in closed position;

Fig. 5 is a similar view showing the dies in open position;

Fig. 6 is an enlarged sectional view on the line 6—6, Fig. 3;

Fig. 10 is an enlarged section on the line 10—10, Fig. 4; and

Fig. 11 is a side elevation of the tool in operation.

Figures 7, 8:
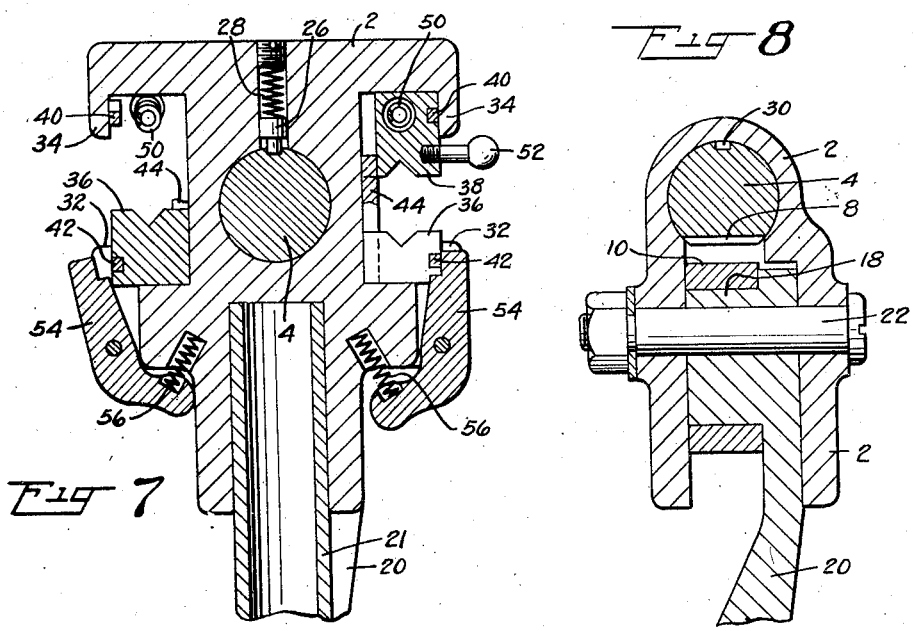
Fig. 7 is a section on the line 7—7, Fig. 1.
Fig. 8 is a section on the line 8—8, Fig. 1.

Referring more particularly to the drawings, 2 is a tool head having a bore in which fits the round bar 4 constituting a draw bar carrying the split die 6. The bottom face of this draw bar is provided with ratchet teeth 8 with which a pawl 10 engages, this pawl being reciprocated so as to cause the draw bar to move from right to left when the tool is positioned as shown in Figs. 2 and 11. The tool head contains a socket 12 within which is a plunger 14 and a spring 16 which causes the plunger to hold the nose of the pawl in engagement with the ratchet teeth 8. The pawl itself is mounted on an eccentric 18 carried by a handle 20 pivoted to the base at 22, the boss being eccentric to the pivot so that as the handle 20 is oscillated the nose of the pawl is moved backward and forward so as to propel the draw bar on account of engagement with the ratchet teeth 8. The pawl is provided with a handle 24, whereby it can be retracted against the action of the spring 16 so as to permit the draw bar to be moved manually to bring the die up close to the head of the tool. The head of the tool carries a pin 26 which is held by a spring 28 in a longitudinal groove 30 of the draw bar so as to prevent the draw bar from turning and keep the teeth 8 in proper alinement with the pawl. The spring pressed pin 26 creates friction on the bar 4 preventing the bar 4 from being drawn back by the frictional action of the pawl 10 on its reverse stroke. The head 2 is provided on each side with spaced overhanging portions 32—34 which constitute guideways for connector clamping jaws 36 and 38. These clamping jaws are provided with guiding channels which embrace guides 40 and 42 which are in the form of U-shaped members, the arms of each U being received in sockets in the overhanging members 32 and 34 so as to be removable and replaceable when the jaws 36 and 38 are removed. This provides a convenient means for forming guides for the jaws.

These guides keep the opposing faces of the jaws in parallel relation and cause them to open and close as they are moved back and forth.

In order to compel the jaws to move simultaneously as they are moved forward or backward to closed or open positions, the opposing jaws are provided with transverse channels in which fit a bar 44, said bar sliding in at least one jaw. 46 is a removable member held in place by screws 48 which member when removed permits the insertion or removal of the upper jaws, the lower jaws when assembled with the upper jaws and the cross bar 44 being also insertable when the member 46 is removed. The member 46 houses jaw actuating springs 50 which are also partially housed in said upper jaws and acting upon said upper jaws tend to move them and also to lower jaws toward closed position. Both jaws of either pair may be simultaneously retracted by a handle 52 connected to the upper jaw and when in retracted position are held in such position by a manually operable latch 54 which is moved into latching position by the spring 56.

Figure 9:
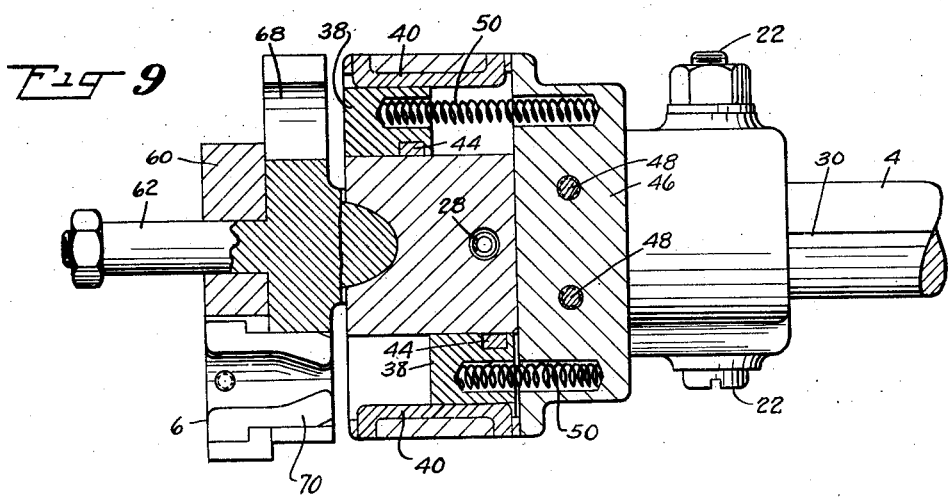
Fig. 9 is a section on the line 9—9, Fig. 1.

The split die 6 consists of two counterpart members which are pivoted at 58 to a block 60 which is rotatably mounted upon a cylindrical extension 62 carried by the draw bar. The draw bar also carries an indexing pin 64 which is adapted to enter either holes 66 in the block 60 according to the angular position of the block and indexes the die for entrance into one of the two sockets 68, said sockets being in alinement with the pairs of connector clamping jaws 36, 38 on the two sides of the base. The dies have extensions 70 adapted to enter the sockets 68, as shown in Fig. 9, the sockets thereupon holding the dies in closed position. These sockets are open-sided, as shown at 72, so that a connector can be introduced and placed in position by a lateral movement when the dies and clamps are open and so that the tool can be removed from the work after its connecting operation has been performed.

In order to hold the second conductor 73 in the connector during the start of the drawing operation I provide a conductor clamp 74 consisting of two pincer members, having jaws 76 so that when the two levers 78 are drawn together the jaws will be drawn together so as to engage a conductor placed between them. The two levers are connected together by a toggle made up of links 80 and to the central pivot of this a central lever is connected to a spring 82 which is connected to the head 2 at 84. In use the conductor lying ahead of the tool is grasped by the conductor clamp, the spring 82 being distended, with the result that the spring 82 maintains the conductor clamp closed upon the conductor and also tends to move the conductor toward the tool so as to maintain its end in contact with the end of another conductor within the connector, the connector being applied.

The handles are provided with loops 86.

The tool as in use is shown in Fig. 11. In using the tool the connector clamping jaws 36 and 38 are retracted and held in retracted position by the latch 54. The die, alined with the uppermost connector clamp, is moved forwardly on the guide 62 and then opened up to admit the work. The work is then inserted laterally, the same comprising a conductor end with a tubular connector of copper or the like surrounding the same. The latch 54 is then released so as to permit the jaws 36—38 to grasp the connector, the initial part of which is reduced in diameter for that purpose and to permit the members of the split die being properly located with reference thereto. The members of the split die are then closed about the reduced portion, the extensions on the die members being caused to enter the upper socket. The handle 20 is then oscillated relatively to the fixed handle 21 causing the pawl 10 to reciprocate and move the draw bar 4 to the left (Figs. 2 and 11), whereupon the drawing die draws the tubular connector upon the conductor within it. As soon as the connector has been drawn sufficiently to bind upon the first conductor end within it, a second conductor end is inserted in the open end of the connector and the conductor clamp 74 applied thereto as shown in Fig. 11 with the spring 82 distended. This holds the second conductor firmly in the connector. Oscillation of the handle 20 is then continued until the connector is completely drawn upon both conductor ends, whereupon the die is opened up and the connector clamp is opened up and the work is removed.

With this apparatus the tool can be reversed and when in either position the tool can be located below the work. The second conductor is held within the connector during the start of the drawing operation. During the insertion of the work within the tool the connector clamping jaws can be held in retracted position ready for release at the proper time so as to make the insertion of the work easier and more expeditious. The actuating pawl is so constructed as to be positive in action and strong in construction and can be easily released when it is desired to return the draw bar to initial position.

As will be evident to those skilled in the art, my invention permits various modifications without departing from the spirit thereof or the scope of the appended claims.

What I claim is:

1. In an apparatus for drawing connectors the combination of a tool head having laterally opening clamping jaws on each side, a draw bar lying in a plane separating said jaws, a die carried by said draw bar, a pawl for propelling said draw bar, and pawl operating handles extending parallel to said separating plane, one of said handles being rigidly connected to said base and the other pivoted thereto and pivotally connected to said pawl.

2. In an apparatus for drawing connectors, a split die, a pair of jaws, and means for producing a relative movement between said die and jaws, means for causing said jaws to move simultaneously either toward or from closed position and maintaining their faces parallel, a retracting handle on one of said jaws, and a spring tending to move said jaws toward closed position.

3. In an apparatus for drawing connectors, a supporting head, a split die, and a pair of jaws carried thereby, and means for producing a relative movement between said die and jaws, means for causing said jaws to move simultaneously either toward or from closed position and maintaining their faces parallel, a spring tending to move said jaws toward closed position, and a manually operable latch for holding said jaws in open position when retracted.

4. In a connector drawing apparatus, a supporting head, a clamp thereon for the connector, a draw bar mounted on said base, means for moving said draw bar relatively to said clamp, a conductor clamp and a spring connection tending to move said conductor clamp toward said connector clamp when said conductor clamp is in engagement with said conductor.

5. In a connector drawing apparatus, a supporting head, a clamp thereon for the connector, a draw bar mounted on said base, means for moving said draw bar relatively to said clamp, a conductor clamp and a spring connection tending to move said conductor clamp toward said connector clamp when said conductor clamp is in engagement with said conductor, said spring when under tension tending to close said conductor clamp.

6. In a drawing apparatus, a supporting head, a clamp thereon, a draw bar also mounted thereon having a drawing die and having ratchet teeth, a handle fixed to said head, and a second handle pivotally connected to said head, said handle having a boss surrounding said pivot and eccentric thereto and a pawl mounted on said eccentric and means tending to move said pawl toward said draw bar so as to engage said ratchet teeth.

7. In a drawing apparatus, a supporting head, a clamp thereon, a draw bar also mounted thereon having a drawing die and having ratchet teeth, a handle fixed to said head, and a second handle pivotally connected to said head, said handle having a boss surrounding said pivot and eccentric thereto and a pawl mounted on said eccentric boss, said base having a socket, and a plunger and spring in said socket holding said pawl in engagement with said ratchet teeth.

In testimony whereof, I have signed my name to this specification this 21st day of February, 1928.

DELAMAR C. KINNEAR.